(12) United States Patent
Grunenberg et al.

(10) Patent No.: US 9,224,021 B2
(45) Date of Patent: Dec. 29, 2015

(54) POINT OF ENTRY DEACTIVATION

(75) Inventors: Lothar Grunenberg, Heppenheim (DE);
Nimesh Shah, Marlton, NJ (US);
Kefeng Zeng, West Deptford, NJ (US)

(73) Assignee: CHECKPOINT SYSTEMS, INC.,
Thorofare, NJ (US)

( * ) Notice: Subject to any disclaimer, the term of this patent is extended or adjusted under 35 U.S.C. 154(b) by 203 days.

(21) Appl. No.: 13/399,091

(22) Filed: Feb. 17, 2012

(65) Prior Publication Data

US 2012/0212343 A1 Aug. 23, 2012

Related U.S. Application Data

(60) Provisional application No. 61/444,429, filed on Feb. 18, 2011.

(51) Int. Cl.
*G08B 13/14* (2006.01)
*G06K 7/10* (2006.01)
*G08B 13/24* (2006.01)

(52) U.S. Cl.
CPC ........ *G06K 7/10356* (2013.01); *G06K 7/10009* (2013.01); *G08B 13/242* (2013.01); *G08B 13/2474* (2013.01); *G08B 13/248* (2013.01)

(58) Field of Classification Search
USPC .......................... 340/572.1–572.9, 10.1–10.5
See application file for complete search history.

(56) References Cited

U.S. PATENT DOCUMENTS

| | | | |
|---|---|---|---|
| 5,030,941 A | 7/1991 | Lizzi et al. | |
| 5,142,292 A | 8/1992 | Chang | |
| 6,061,552 A * | 5/2000 | Cerasini et al. | 455/128 |
| 6,768,419 B2 | 7/2004 | Garber et al. | |
| 6,788,205 B1 | 9/2004 | Mason et al. | |
| 7,051,943 B2 | 5/2006 | Leone et al. | |
| 7,782,207 B2 | 8/2010 | Gillard et al. | |
| 7,800,503 B2 | 9/2010 | De Witte et al. | |
| 2005/0280541 A1* | 12/2005 | Rapp et al. | 340/572.7 |
| 2007/0164845 A1* | 7/2007 | Ivins et al. | 340/3.9 |
| 2007/0210922 A1* | 9/2007 | Clifford et al. | 340/572.3 |
| 2008/0309491 A1* | 12/2008 | Gillard et al. | 340/572.1 |
| 2009/0212952 A1* | 8/2009 | Yang | 340/572.3 |
| 2009/0261976 A1 | 10/2009 | Oung et al. | |
| 2009/0289793 A1* | 11/2009 | Morin | 340/572.1 |
| 2012/0032803 A1* | 2/2012 | Copeland et al. | 340/572.1 |
| 2012/0127059 A1* | 5/2012 | Su et al. | 343/908 |

* cited by examiner

*Primary Examiner* — Ojiako Nwugo
(74) *Attorney, Agent, or Firm* — The Belles Group, P.C.

(57) ABSTRACT

A system and method for automatically deactivating a security tag upon entry into business establishment to prevent tag pollution. The system and method involve positioning a security tag deactivator at an entrance of a business establishment and emitting an EM field sufficient to deactivate any security tag that enters into the business establishment.

18 Claims, 10 Drawing Sheets

FIG. 10

POINT OF ENTRY DEACTIVATION

CROSS-REFERENCE TO RELATED APPLICATION

This application claims the benefit under 35 U.S.C. §119(e) of the earlier filing date of U.S. Provisional Application Ser. No. 61/444,429 filed on Feb. 18, 2011, the entire disclosure of which is hereby incorporated by reference herein as if being set forth in its entirety.

BACKGROUND

1. Technology Field

This disclosure generally relates to the field of security tags, and more particularly, to a system and method for automatically deactivating a security tag upon entry into a business establishment.

2. Description of Related Art

One way of providing security for merchandise in a retail facility is the use of traditional electronic article surveillance (EAS) systems. Such systems include a transponder (also referred to as "EAS security tags") affixed to each article of merchandise to be protected and an EAS detection gate. The transponder normally takes the form of an electromagnetically responsive element enclosed in a plastic label, paper tag, sleeve of fabric, or hard plastic case. Security tags may comprise hard tags or soft tags wherein hard tags include a security element(s) within an enclosure or housing that can be detached from the article it is protecting and typically re-used. Soft security tags, on the other hand, are in the form of a label (e.g., a sticker, care-label, content label, paper hang-tag, etc.) that are typically planar in form. This disclosure is directed to deactivatable soft tags. The responsive element may be a strip of ferromagnetic material, a section of acoustomagnetostrietive metallic glass, a parallel resonant circuit made with a capacitor and an inductor, a strip antenna connected to a diode, or an antenna coupled with a radio frequency identification (RFID) integrated circuit, i.e., an RFID security tag. These technologies, termed EM, AM, RF, RFID and microwave, respectively, normally operate at a characteristic frequency determined by a combination of regulatory and historical reasons. The detection device consists of an antenna connected to both a transmitter and a receiver. The transmitter is arranged to provide a stimulating signal to the transponder element. The receiver is arranged to determine whether a transponder element of the requisite type is near the detector; for RFID security tag detection, RFID readers are used. Typically, detection devices are used to sound an alarm if a transponder is detected by a device located at a point of egress. When merchandise is purchased, HAS security tags or RFID security tags may either be removed or be deactivated by the application of special electromagnetic fields. Typically, in the U.S., such EAS anti-theft security systems use 8.2 MHz and associated 8.2 MHz security tags whereas RFID anti-theft security systems use 13.56 MHz, 900 MHz or 2.4 GHz+ along with the associated RFID security tags.

However, security tags that are not deactivated at the point of purchase either by omission or by failed deactivation can cause false alarms at subsequent stores. The frequency of such false alarms has been termed "tag pollution." To avoid this problem of tag pollution, conventional methods have been to: (a) ask consumers to remove the tag; or (b) permanently deactivate these security tags. But the problem with such conventional methods has been that: (a) the consumers do not comply with removing the tags after purchase; or (b) many conventional tag deactivators cannot guarantee security tag deactivation and security tags designed to guarantee permanent deactivation are currently too expensive.

What is needed is a system and method to automatically deactivate a security tag upon entry into a business establishment, thus eliminating the false alarms caused by live security tags being reintroduced back into the same establishment or introduced from another store into the establishment. Deactivating security tags at entry into a business establishment, herein known as the point of entry, will eliminate tag pollution.

The term "security tag" as used in this Specification covers all types of soft deactivatable security tags, including EAS security tags and RFID security tags.

SUMMARY

Embodiments of this disclosure are directed a deactivation system including a security tag deactivator positioned at or near an entrance of a business establishment. The security tag deactivator may be oriented to generate an electromagnetic field in the entrance of the business establishment. The electromagnetic field can deactivate a security tag accompanying a person at or near the entrance. The security tag deactivator includes at least one antenna and at least one current generator coupled to the at least one antenna.

According to one embodiment, the current generator is coupled to the antenna by a pair of generator leads. The current generator drives current to flow from one generator lead through the antenna to the other generator lead to generate the electromagnetic field about the antenna.

According to one aspect of one embodiment, the at least one antenna includes an antenna perimeter and a middle antenna portion. The middle antenna portion is designed in the shape of the letter S and connects to the antenna perimeter at opposing sides of the antenna perimeter.

According to another embodiment, the security tag deactivator includes two or more antennas and at least two current generators. The at least two current generators are each coupled to the two or more antennas. The current generator is coupled to the antenna by a pair of generator leads. The current generator drives current to flow from one generator lead through the antenna to the other generator lead to generate the electromagnetic field about the antenna. The at least two antennas are configured as loop antennas, including a first antenna configured as a vertical two-loop antenna and a second antenna configured as a horizontal two-loop antenna.

According to one aspect of one embodiment, the vertical two-loop antenna includes a vertical antenna perimeter and a vertical antenna middle strip. One end of the vertical antenna middle strip connects to one side of the vertical antenna perimeter. The other end of the vertical antenna middle strip is coupled to a first current generator by a first generator lead of the first current generator. A side of the vertical perimeter, opposite the side of the vertical perimeter connected to the vertical antenna middle strip, is coupled to the first current generator by a second generator lead of the first current generator. The vertical antenna middle strip divides the vertical antenna perimeter into two nearly equal halves. One half is vertically aligned in relation to the other half The horizontal two-loop antenna includes a horizontal antenna perimeter and a horizontal antenna middle strip. One end of the horizontal antenna middle strip connects to one side of the horizontal antenna perimeter. The other end of the horizontal antenna middle strip is coupled to a second current generator by a first generator lead of the second current generator. A side of the horizontal perimeter, opposite the side of the horizontal perimeter connected to the horizontal antenna middle strip, is coupled to the second current generator by a second generator lead of the second current generator. The horizontal antenna middle strip divides the horizontal antenna perimeter into two nearly equal halves wherein one half is horizontally aligned in relation to the other half. The vertical antenna middle strip and horizontal middle strip are positioned orthogonal to one another so as to form a cross.

According to another embodiment, a direction sensing device configured to determine whether a tag is entering or leaving the store, wherein the security tag deactivator deactivates tags based on the direction the security tag moves.

Embodiments of this disclosure are directed to a deactivator including an antenna configured to transmit an electromagnetic field sufficient to deactivate a security tag when a current flows through the antenna. The deactivator further includes a current generator coupled to the antenna by one or more generator leads to drive the current to flow through the antenna. The deactivator further includes a housing configured to include at least one of the antenna and current generator. The housing is configured to stand or mount such that the electromagnetic field covers at least a portion of an entrance of a business establishment.

According to one embodiment, the housing is a pedestal that stands upright on a floor in the entrance of a business establishment and the pedestal encloses the antenna. According to another embodiment, the housing is a pedestal that stands upright on a floor in the entrance of a business establishment and the antenna is located on the surface of the pedestal.

According to one embodiment, the antenna includes an antenna perimeter and a middle antenna portion. The middle antenna portion is designed in the shape of the letter S and connects to the antenna perimeter at opposing sides of the antenna perimeter.

According to another embodiment, the deactivator further includes a second antenna and a second current generator coupled to the second antenna. The two antennas are configured as loop antennas, including the first antenna configured as a vertical two-loop antenna and the second antenna configured as a horizontal two-loop antenna.

According to one aspect of one embodiment, the vertical two-loop antenna includes a vertical antenna perimeter and a vertical antenna middle strip. One end of the vertical antenna middle strip connects to one side of the vertical antenna perimeter. The other end of the vertical antenna middle strip is coupled to a first current generator by a first generator lead of the first current generator. A side of the vertical perimeter, opposite the side of the vertical perimeter connected to the vertical antenna middle strip, is coupled to the first current generator by a second generator lead of the first current generator. The vertical antenna middle strip divides the vertical antenna perimeter into two nearly equal halves. One half is vertically aligned in relation to the other half. The horizontal two-loop antenna includes a horizontal antenna perimeter and a horizontal antenna middle strip. One end of the horizontal antenna middle strip connects to one side of the horizontal antenna perimeter. The other end of the horizontal antenna middle strip is coupled to a second current generator by a first generator lead of the second current generator. A side of the horizontal perimeter, opposite the side of the horizontal perimeter connected to the horizontal antenna middle strip, is coupled to the second current generator by a second generator lead of the second current generator. The horizontal antenna middle strip divides the horizontal antenna perimeter into two nearly equal halves. One half is horizontally aligned in relation to the other half. The vertical antenna middle strip and horizontal middle strip are positioned orthogonal to one another so as to form a cross.

Embodiments of this disclosure are directed to a method for a business establishment to prevent false security alarms caused by tag pollution. The method includes positioning a security tag deactivator at or near an entrance of the business establishment. The method also includes orienting the security tag deactivator to generate an electromagnetic field at or near the entrance of the business establishment. The method also includes deactivating an unwanted security tag entering into the business establishment.

According to one embodiment, the step of deactivating the security tag includes first detecting the direction in which the security tag is moving and deactivating based on the direction the security tag is moving.

According to another embodiment, the step of deactivating the security tag includes driving a flow of current from a current generator to an antenna. The antenna is coupled to the current generator by a pair of generator leads. The antenna and current generator form a portion of the security tag deactivator.

According to one embodiment, the antenna includes an antenna perimeter and a middle antenna portion. The middle antenna portion is designed in the shape of the letter S and connects to the antenna perimeter at opposing sides of the antenna perimeter.

According to another embodiment, the deactivator further includes a second antenna and a second current generator coupled to the second antenna. The two antennas are configured as loop antennas including the first antenna configured as a vertical two-loop antenna and the second antenna configured as a horizontal two-loop antenna.

According to one aspect of one embodiment, the vertical two-loop antenna includes a vertical antenna perimeter and a vertical antenna middle strip. One end of the vertical antenna middle strip connects to one side of the vertical antenna perimeter. The other end of the vertical antenna middle strip is coupled to a first current generator by a first generator lead of the first current generator. A side of the vertical perimeter, opposite the side of the vertical perimeter connected to the vertical antenna middle strip, is coupled to the first current generator by a second generator lead of the first current generator. The vertical antenna middle strip divides the vertical antenna perimeter into two nearly equal halves. One half is vertically aligned in relation to the other half. The horizontal two-loop antenna includes a horizontal antenna perimeter and a horizontal antenna middle strip. One end of the horizontal antenna middle strip connects to one side of the horizontal antenna perimeter. The other end of the horizontal antenna middle strip is coupled to a second current generator by a first generator lead of the second current generator. A side of the horizontal perimeter, opposite the side of the horizontal perimeter connected to the horizontal antenna middle strip, is coupled to the second current generator by a second generator lead of the second current generator. The horizontal antenna middle strip divides the horizontal antenna perimeter into two nearly equal halves. One half is horizontally aligned in relation to the other half. The vertical antenna middle strip and horizontal middle strip are positioned orthogonal to one another so as to form a cross.

According to another embodiment, the step of positioning the security tag deactivator includes enclosing the antenna into a pedestal. According to another embodiment, the step of positioning the security tag deactivator comprises attaching the antenna onto a pedestal. The pedestal stands upright on a floor in the entrance of the business establishment.

BRIEF DESCRIPTION OF SEVERAL VIEWS OF THE DRAWINGS

The disclosure will be described in conjunction with the following drawings in which like reference numerals designate like elements and wherein.

DETAILED DESCRIPTION

The accompanying drawings are intended to provide further understanding of the disclosure and are incorporated in and constitute a part of the description of the disclosure. The drawings illustrate embodiments and together with the description illustrate principles of this disclosure.

The drawings should not be taken as implying any necessary limitation on the essential scope of this disclosure. The drawings are given by way of non-limitative example to explain the nature of the disclosure.

For a more complete understanding of the disclosure, reference is now made to the following description taken in conjunction with accompanying drawings.

The various features of novelty are pointed out specifically in the claims which are a part of this description. For a better understanding, reference should be made to the drawings and descriptive matter in which there are illustrated and described preferred embodiments.

The disclosure differs from other attempts by not relying on the consumer to remove the tag or another store to properly deactivate the tag. The disclosure also relies only on the standard technology tags (e.g., EAS security tags or RFID security tags). This disclosure deactivates live tags (meaning "non-deactivated security tags") when a person enters the store, at the point of entry. Deactivation of the tag carried by the person may occur at or near the entrance of the store. The entering customer walks through a portal which deactivates the live tags carried by the person, which may be unwanted by the retailer. When the customer leaves the store, the live tags (now deactivated) that entered the store with the person will not alarm the exit system.

This has many benefits for the consumer and retailer. The consumer is not stopped for a false reason. The store is not wasting time stopping customers that have not taken items from the store.

The solution can take the form of two pedestals placed on either side of the entrance where the pedestals have an output similar to standard deactivation pedestals. "Pedestal", as referred to here and elsewhere in the disclosure, shall mean a housing that freely stands with Which the antenna is located, sometimes referred to as an EAS antenna or gate in the industry. The deactivator, for deactivating security tags, can be located at approximately the midsection of an entering patron. The pedestals may stand upright on the floor of a business establishment and may be located in or near the entrance of the business establishment. The deactivator may also be located higher or lower than the midsection of an entering patron. The deactivator may herein be referenced as a deactivating generator.

Figure 1:
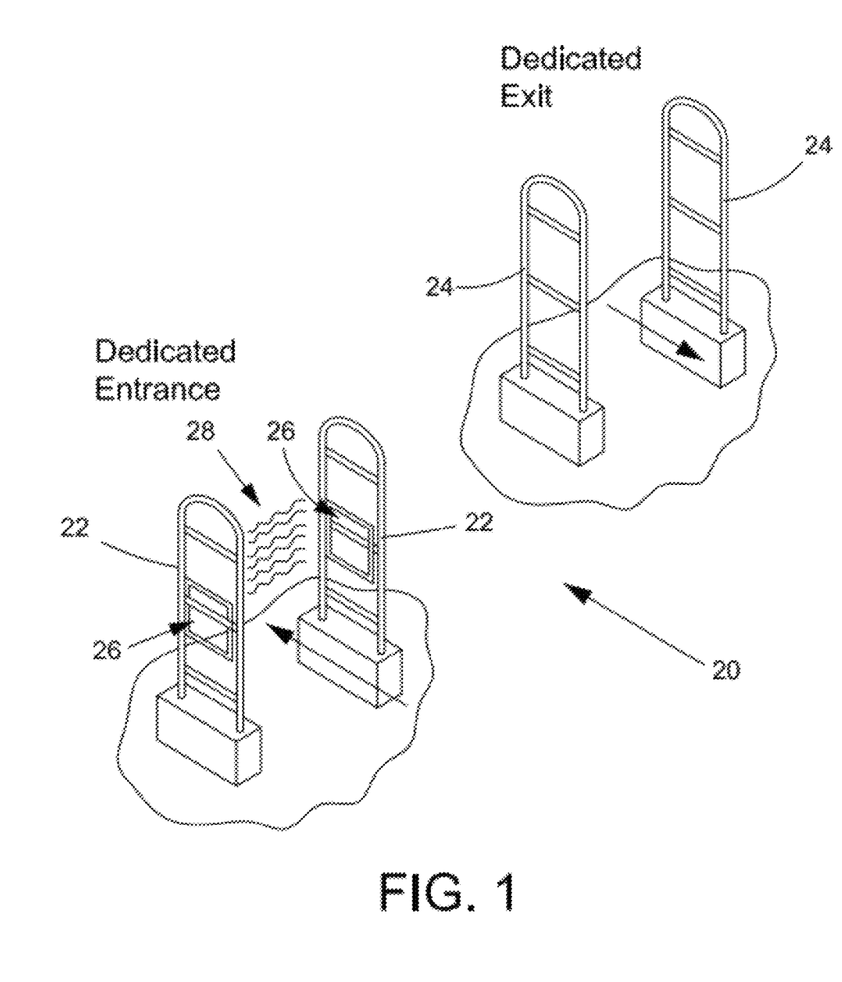
FIG. 1 depicts an exemplary system/method wherein a retail establishment has a distinct entrance and :Ail: with associated pedestals.

Stores have different formats for their entry/exits. For the "one-way" entry/exit, customers enter through one set of doors and exit through a different set of doors. This "one-way" configuration would only require a deactivation portal at the entrance. In particular, FIG. 1 depicts an exemplary embodiment of the present system/method 20 for a retail establishment having a dedicated entrance (also referred to as a "deactivation portal") and a dedicated exit with respective entrance pedestals 22 and exit pedestals 24. The entrance pedestals 22 comprise a deactivating generator 26, located at the midsection of an entering patron (not shown), which generates the deactivating electromagnetic (EM) field 28 continuously at the entrance. The exit pedestals 24 operate in accordance with conventional EAS or RFID security tag detection operation. The deactivator may he oriented, including positioned or angled, such that the EM field 28 is provided over at least a portion of an entrance.

For bi-directional doorways, i.e., where customers enter and exit through the same doorway, it is necessary to determine when to deactivate and when not to deactivate depending on the direction of the patron. In this bi-directional doorway instance, a directional device is implemented which triggers deactivation only for inbound patrons. U.S. Pat. No. 5,030,941 (Lizzi., et al.) and U.S. Pat. No. 7,782,207 (Gillard, et al.), both of which are owned by the same Assignee as the present application, namely, Checkpoint Systems, Inc., disclose "direction detectors" associated with or integrated with detection pedestals that can detect the direction of movement of the security tags. Both of these references are incorporated by reference in their entireties.

Figure 2:
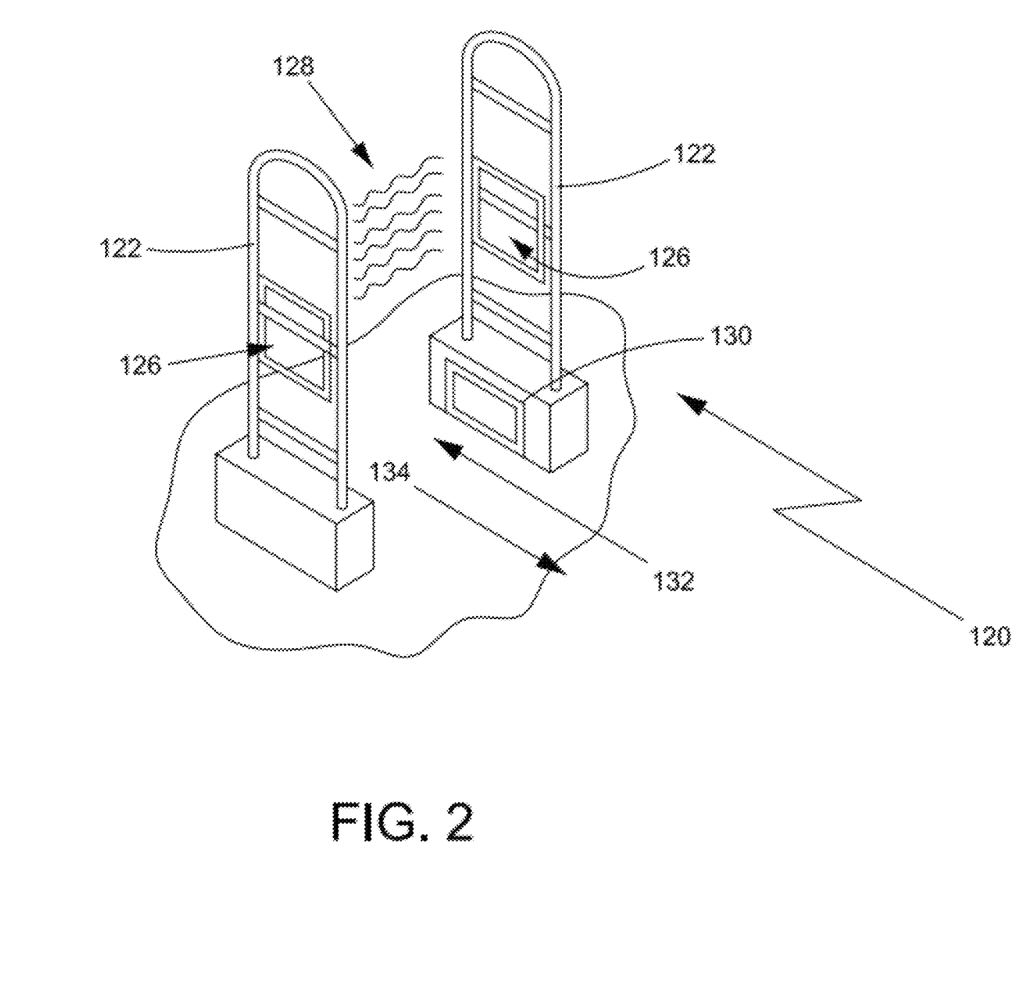
FIG. 2 depicts an exemplary system/method wherein a retail establishment has a bi-directional doorway with associated pedestals that include a direction detector.
Figure 3:
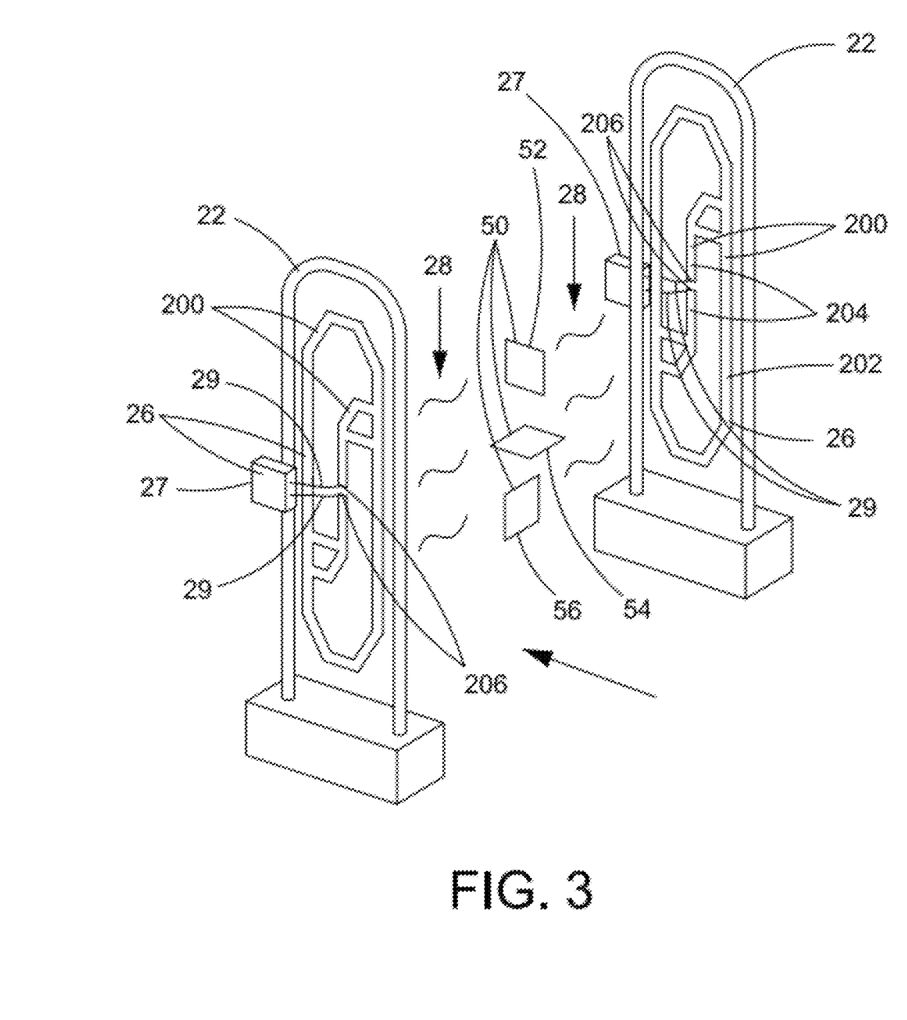
FIG. 3 depicts exemplary deactivating generators, with S-shape antennas, according to one embodiment.

In particular, FIG. 2 depicts an exemplary embodiment of the present system/method 120 for a retail establishment having a bi-directional doorway. In this embodiment 120, the pair of pedestals 122 comprise a direction detector 130, which may be a sensor that can detect movement including the direction of movement, and a deactivating generator 126. Although there are a number of ways to detect movement, one exemplary way is to configure the pedestal processor (not shown) to have the direction detector detect movement into the retail establishment, i.e., in the direction of arrow 132. If the direction detector 130 detects such movement, the processor activates the deactivating generator 126 to emit the deactivating EM field 128. If, on the other hand, no movement in the direction of the arrow 132 is detected, the pedestals 126 act in the normal course, i.e., monitoring the interrogation zone for security tags as they leave the retail establishment, viz., in the direction of the arrow 134, FIG. 3 depicts exemplary deactivating generators 26 with S-shape antennas 200. In the preferred embodiment, and as shown in FIG. 3, entrance pedestals 22 comprise deactivating generators 26, to generate the continuous deactivating electromagnetic (EM) field 28. A deactivating generator 26 may be located in each entrance pedestal 22. The deactivating generator 26 includes a current generator 27 coupled to an antenna, wherein the antenna shown in FIG. 3 is an S-shape antenna 200. Entrance pedestals 22 are shown in FIG. 3 as transparent so as to view the S-shape antenna 200 in both pedestals. When current flows through the antenna, as driven by the current generator 27, the resultant deactivating EM field 28 is created about the antenna as transmitted by the antenna.

Figure 4:
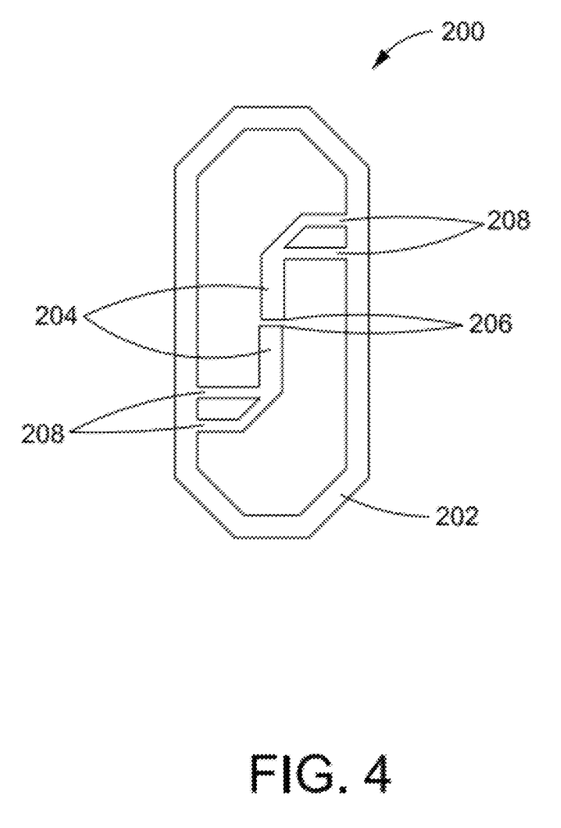
FIG. 4 depicts the S-shape antenna of FIG. 3 according to one embodiment.

FIG. 4 depicts the S-shape antenna 200 of FIG. 3. As shown in FIG. 4, S-shape antenna 200 may be a continuous antenna piece with the only disconnection between one middle antenna connection end 206 and the other middle antenna connection end 206. Antennas of the deactivating generator 26, including the S-shape antenna 200, are preferably made with copper. Alternatively, other conductive materials may be utilized to form the antenna as known by one of ordinary skill in the art. In the preferred embodiment, the copper material is embedded in a tape so that one side of the tape may adhere to the entrance pedestal 22. In the preferred embodiment, the copper tape is two inches thick. Thicker or thinner tape or other conductive material may be used. In the preferred embodiment, the two inch thick copper tape is used to simplify both fabrication and performance tuning of the deactivating generator 26.

As shown in FIG. 4, the S-shape antenna 200 is partially formed by an antenna perimeter 202 shaped as an elongated octagon. In the preferred embodiment, the elongated octagon shape of the antenna perimeter 202 approximately matches the height and width of the entrance pedestal 22 in which the S-shape antenna 200 is located (see FIG. 3). As shown in FIG. 4, a middle antenna portion 204 is located inside the octagon shaped antenna perimeter 202 and connected to the antenna perimeter 202 at perimeter connections 208. The middle antenna portion 294 is designed in the shape of the letter "S". As shown in FIG. 4, the middle antenna portion 204 is connected to two opposing walls of the antenna perimeter 202, at two perimeter connections 208 on each wall. The only disconnect in the S-shape antenna 200, as shown in FIG. 4, is between the middle antenna connection ends 206. In other embodiments, the antenna perimeter 202 may be shaped as a square, rectangle, circle, or any other shape so that the deactivating generator 26 may conduct an EM field 28, as transmitted by the antenna. In other embodiments, the middle antenna portion 204 may be Shaped differently and/or connect to the antenna perimeter 202 at one or more various locations. In other embodiments, the antenna perimeter 202 may not include a middle antenna portion 204 or the middle antenna portion 204 may not include an antenna perimeter 202. In other embodiments, the S-shape antenna 200 may be of different shape, size, and/or made of different material so that the deactivating generator 26 may conduct an EM field 28.

Referring again to FIG. 3, the S-shape antenna 200 is located inside the entrance pedestal 22 as taped on the inside of the pedestal side wall, within the housing of entrance pedestal 22 on the side facing the other entrance pedestal 22. Typically, walls of the entrance pedestals 22 are opaque, so that one may not see the S-shape antenna 200 housed inside. Other entrance pedestals 22, and as shown in FIG. 3, may be transparent. In other embodiments, antennas, such as the S-shape antenna 200, may be located internally or externally on any of the sides of the entrance pedestal 22. Antennas may also be embedded into the wall of the entrance pedestal 22 or located on or in another material located within the walls of the entrance pedestal 22. As shown in the preferred embodiment, the S-shape antenna 200 is approximately the width and height of entrance pedestal 22.

As shown in FIG. 3, each S-shape antenna 200 is coupled to a current generator 27 in each entrance pedestal 22. In the preferred embodiment, the current generator 27 is a high power generator. A high power generator may be a CPIX generator, known in the art. One of two generator leads 29 connect the current generator 27 to one middle antenna connection end 206 and the other generator lead 29 connects to the other middle connection end 206 in the S-shape antenna 100 so as to drive a current that flows through the S-shape antenna 200 from connection to one generator lead 29 and to the connection with the other generator lead 29 resulting in an EM field 28 about the entrance pedestals 22. The middle antenna connection ends 206 serve as a feeding point where the generator leads 29 connect with the S-shape antenna 200. The generator leads 29 may, for example, be twisted pair of cable. The EM field 28 produces flux lines 361 (see FIG. 5 through FIG. 7) in a resulting deactivation field pattern (see FIG. 5 through FIG. 7), wherein the deactivation field deactivates the security tag 50 about the portal, in proximity to the deactivating generators 26 of entrance pedestals 22.

Figure 5:
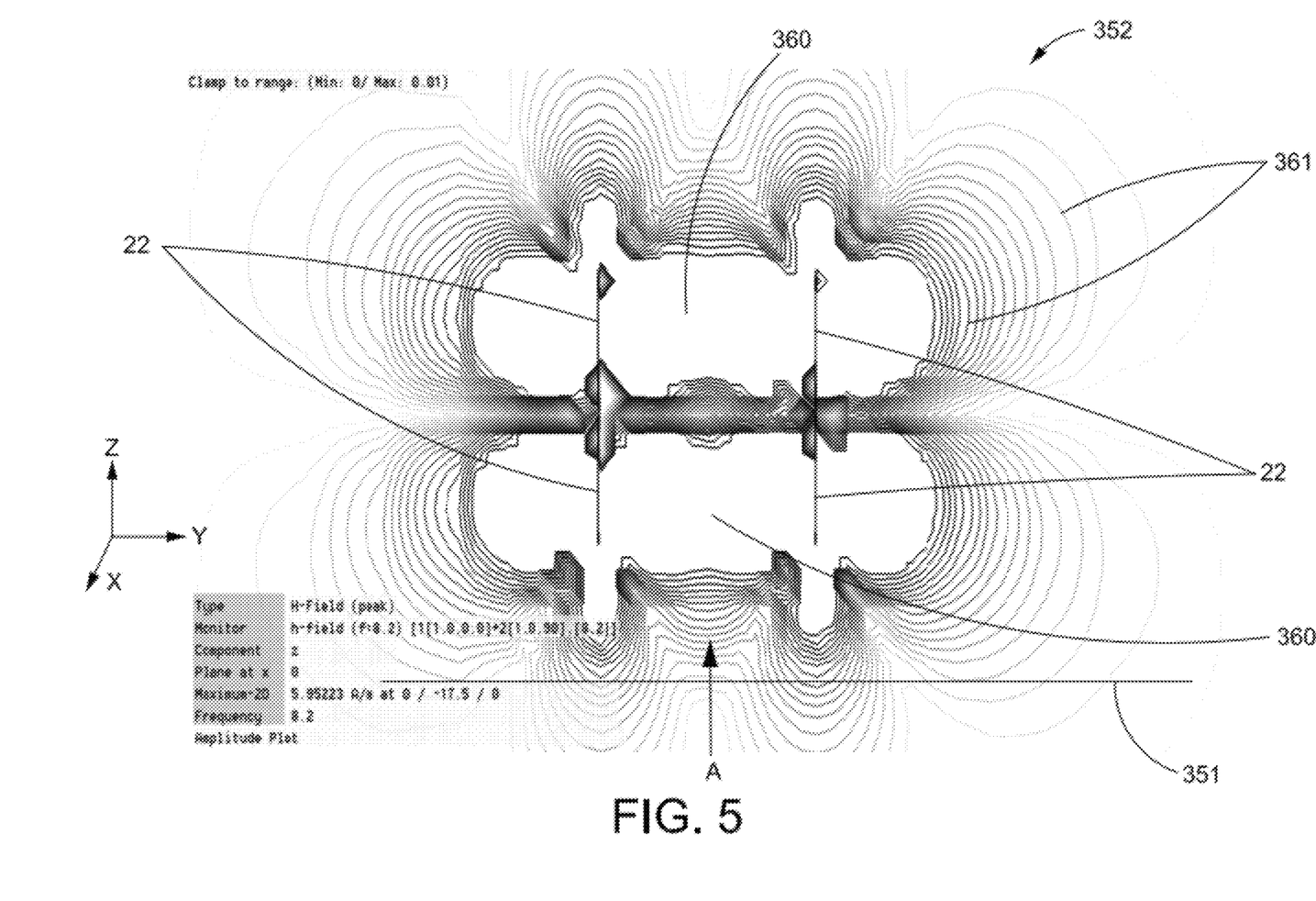
FIG. 5 depicts a screen shot of a simulated deactivation field pattern for a side carry tag in a front facing view of entrance pedestals according to one embodiment.
Figure 6:
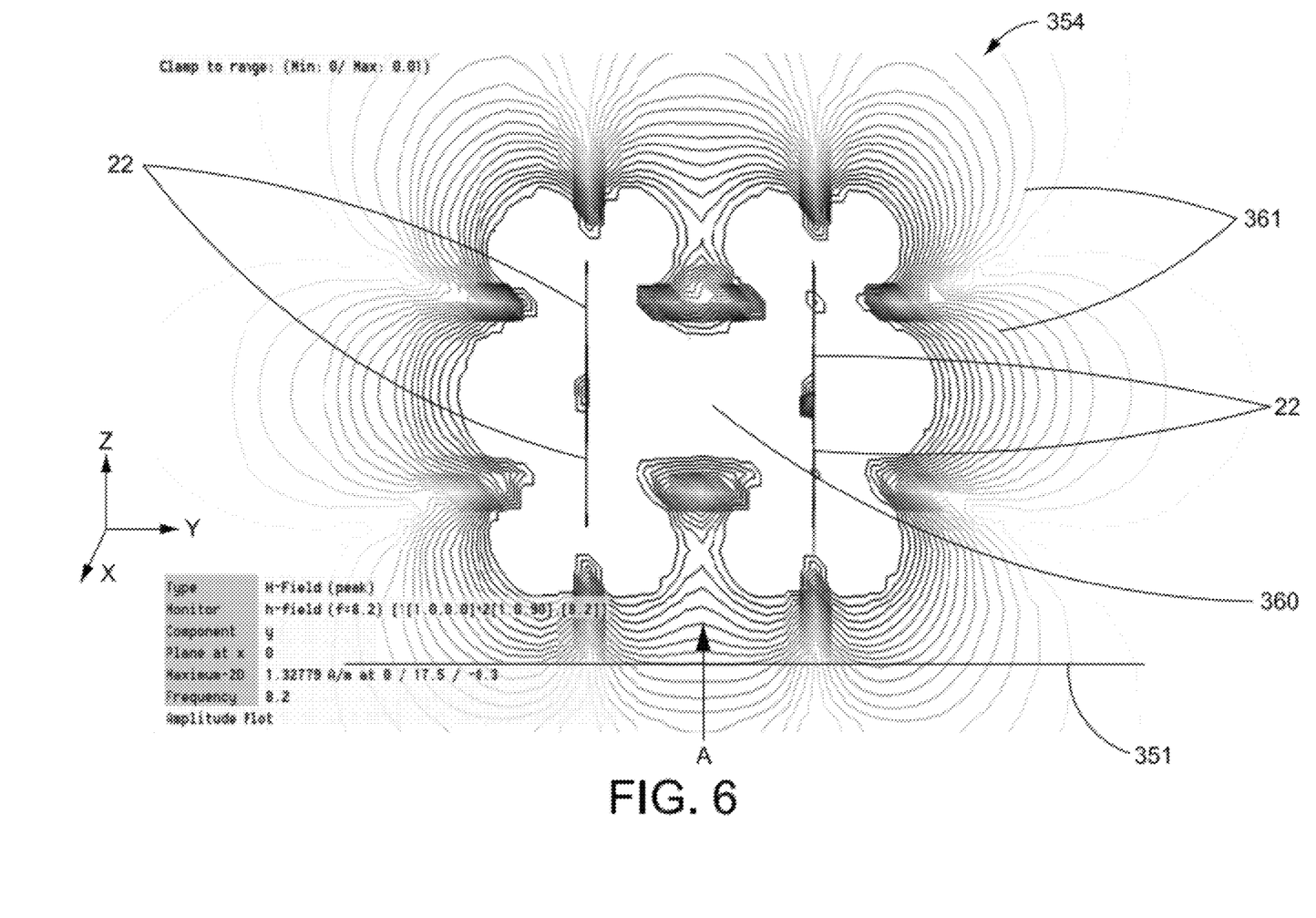
FIG. 6 depicts a screen shot of a simulated deactivation field pattern for a flat carry tag in a front facing view of entrance pedestals according to one embodiment.
Figure 7:
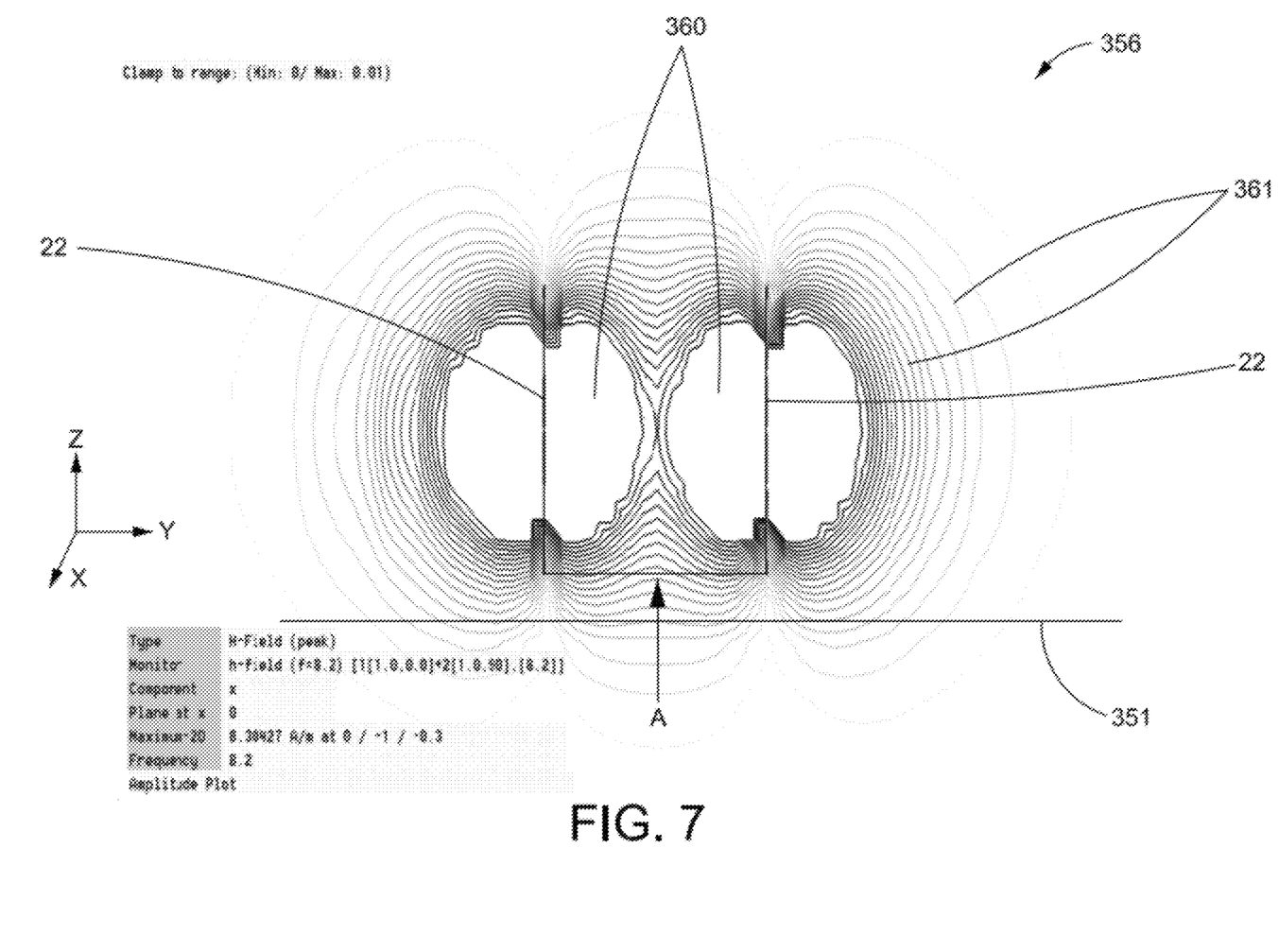
FIG. 7 depicts a screen shot of a simulated deactivation field pattern for a front carry tag in a front facing view of entrance pedestals according to one embodiment.

The S-shape antenna 200, of the preferred embodiment, provides for far-field cancellation, as demonstrated by weakening flux lines 361 shown as darker lines transitioning to lighter lines going away from the entrance pedestals 22 in FIG. 5 through FIG. 7. The far-field cancellation addresses emission requirements, while the S-shape antenna 200 creates strong near-field emissions necessary to deactivate security tags 50 of various orientations in EM field 28. The S-shape antenna 200 is symmetrically divided into two halves that generate magnetic fields equally and in opposite directions as the current flows through the S-shape antenna 200. In the far-field region (a distance is much greater than the antenna's overall dimensions), the magnetic fields generated by the two halves of antenna cancel each other, resulting in nearly zero net field. In the near-field region (a distance less than the overall dimensions of the antenna), as the security tag 50 moves between the entrance pedestals 22, the security tag 50 will capture more field from on half of the antenna than from the other half of the antenna causing deactivation. The resultant far-field cancellation due to the design of the S-shape antenna 200 allows the system to transmit about 20 dB more power while remaining within regulatory limits (for regulatory compliance, only far-field emissions are measured), which thereby achieves a deactivation distance typically not possible with conventional deactivation antennas. The design of the S-shape antenna 200 creates a deactivation field pattern that confines the energy of the deactivation field within the proximity of the deactivating generator 26 so as not to interfere with other devices at further distance.

As shown in FIG. 3, security tag 50 may pass through entrance pedestals 22 in one of a variety of different orientations, including at various angles. For example, security tag 50 may enter and pass through entrance pedestals 22 in the orientation of a side carry tag 52. The side carry tag 52 passes through the entrance pedestals 22 at an angle Where the two opposing larger sides of the side carry tag 52 each face the entrance pedestals 22 when the side carry tag 52 moves between the two entrance pedestals 22. On a person walking through entrance pedestals 22, security tag 50 may he in the orientation of side carry tag 52 when located in, for example, a purse or within the sleeve of clothing. A security tag 59 may enter and pass through entrance pedestals 22 in the orientation of a flat carry tag 54. The flat carry tag 54 passes through the entrance pedestals 22 at an angle where the two opposing larger sides of the flat carry tag 54 each face orthogonal to the entrance pedestals 22, with one side facing the floor on which the entrance pedestals 22 stand and the other side facing the ceiling. On a person walking through the entrance pedestals 22, security tag 50 may be in the orientation of flat carry tag 54 when located in, for example, a hat or the bottom of a shoe. Security tag 50 may enter and pass through entrance pedestals 22 in the orientation of a front carry tag 56. The front carry tag 56 passes through the entrance pedestals 22 at an angle where the two opposing larger sides of the front carry tag 54 each face orthogonal to the entrance pedestals 22 when located between the entrance pedestals 22, with one side facing the entering direction of a person or patron through the entrance pedestals 22 and the other side facing the exiting direction of a patron through the entrance pedestals 22. On a patron walking through the entrance pedestals 22, security tag 50 may he in the orientation of front carry tag 56 when located in for example the front pocket or collar of a shirt.

FIG. 5 depicts a screen shot of a simulated side carry deactivation field pattern 352 for a side carry tag 52 in a front facing view of entrance pedestals 22. The views in FIG. 5 through FIG. 7, are shown from the perspective of a patron walking towards the entrance pedestals 22, resting on floor 351, as the patron moves in direction A towards and through the entrance pedestals 22. The edges of the entrance pedestals 22 can he viewed in FIG. 5 through FIG. 7, looking in direction A. Direction A is opposite direction X, of plane X-Y being the floor, as denoted by the X-Y-Z orientation vectors in the bottom left corner of FIG. 5 through FIG. 7. With the deactivating generator 26 producing an EM field 28, as shown in FIG. 3, a side carry deactivation field pattern 352 results. FIG. S shows the locations around the entrance pedestals 22 most susceptible for deactivating a security tag 50 in the position of side carry tag 52. As shown in FIG. 5, the side carry deactivation field pattern 353 weakens in the direction away from the entrance pedestals 22, as shown by the flux lines 361 going from darker lines near the entrance pedestals 22 to lighter lines further away from the entrance pedestals 22. The deactivation field pattern 353 is strongest as indicated by the solid white portion of the field located in proximity to the entrance pedestals 22, referred to as the deactivation zones 360. In the deactivation zone 360, a security tag 50 is more likely to deactivate than in any other location about the entrance pedestals 22. As shown in FIG. 5, the side carry deactivation field pattern 352 is symmetric above and below the entrance pedestals 22.

FIG. 6 depicts a screen shot of a simulated flat Carry deactivation field pattern 354 for a flat carry tag 54 in a front facing view of entrance pedestals 22. With the deactivating generator 26 producing an EM field 28, as shown in FIG. 3, a flat carry deactivation field pattern 354 is produced. FIG. 6 shows the locations around the entrance pedestals 22 most susceptible for deactivating a security tag 50 in the orientation of flat carry tag 54.

FIG. 7 depicts a screen shot of a simulated front carry deactivation field pattern 356 for a front carry tag 56 in a front facing view of entrance pedestals 22. With the deactivating generator 26 producing an EM field 28, as shown in FIG. 3, a front carry deactivation field pattern 356 is produced. FIG. 7 shows the locations around the entrance pedestals 22 most susceptible for deactivating a security tag 50 in the orientation of front carry tag 56.

For a security tag 50 at any orientation at or between the orientation of side carry tag 52, flat carry tag 54, and/or front can tag 56, the deactivating generator 26 may deactivate the security tag 50. The above identified deactivation field patterns 352, 354, 356, as shown in FIG. 5 through FIG. 7, replicate the deactivation fields generated by the S-shape antenna 200 in the deactivating generator 26 of the preferred embodiment. The deactivation fields may differ for side carry tags 52, flat carry tags 54, or front carry tags 56 or security tags 50 at any other orientation depending on the size, and/or shape of the antenna of the deactivating generator 26.

Figure 8:
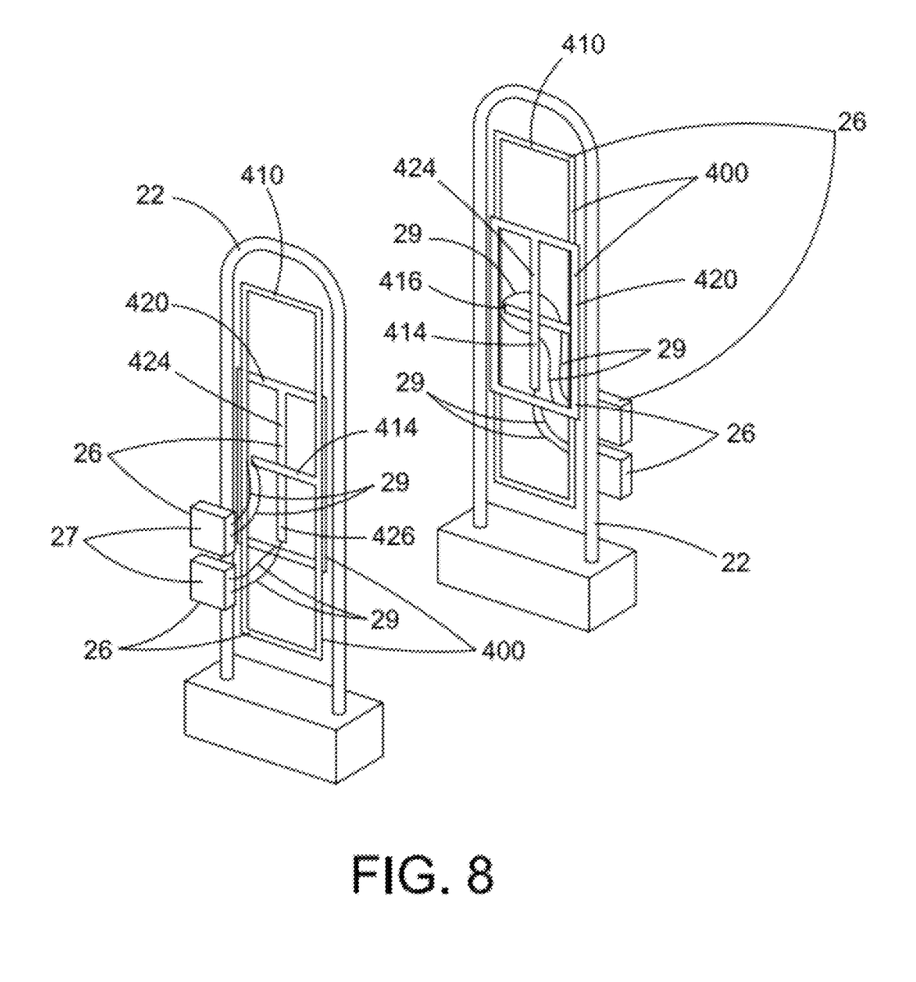
FIG. 8 depicts exemplary deactivating generators utilizing loop antennas according to one embodiment.

FIG. 8 depicts exemplary deactivating generators 26 utilizing loop antennas 400. In an alternative embodiment, and as shown in FIG. 8, entrance pedestals 22 may comprise more than one deactivating generator 26, to generate the continuous deactivating electromagnetic (EM) field 28. In this alternative embodiment, two deactivating generators 26 are located about each entrance pedestal 22 of the pair of entrance pedestals 22. Each deactivating generator 26 includes a current generator 27 coupled to each loop antenna 400. Two loop antennas 400 are shown located on each entrance pedestal 22, one being a vertical two-loop antenna 410 and the other being a horizontal two-loop antenna 420, as shown in FIG. 8. Entrance pedestals 22 are shown in FIG. 8 as transparent so as to view both the vertical two-loop antenna 410 and a horizontal two-loop antenna 420 on each pedestal 22.

The vertical two-loop antenna 410 is divided into two nearly equal halves by the vertical antenna middle strip 414, wherein one half is vertically aligned above the other half, and the horizontal two-loop antenna 420 is divided into nearly two equal halves by the horizontal antenna middle strip 424, wherein one half is horizontally aligned to the side of the other half With the loop antennas 400 split symmetrically into two halves, the current flow from the current generator 27 is equally split into opposite directions thus generating a magnetic flux from about each half that cancel each other out in the far-field. The pattern created by the location of the vertical two-loop antenna 410 and the horizontal two-loop antenna 420 on the entrance pedestals 22 is formed such that the halves in the vertical two-loop antenna 410 are orthogonal to the halves in the horizontal two-loop antenna 420. The orthogonal pattern formed by the vertical two-loop antenna 410 and horizontal two-loop antenna 420 creates a three dimensional deactivating field pattern effect for deactivating security tags 50 of all orientations. Like the S-shape antenna 200, the magnetic fields generated by the two halves of the antenna cancel each other, resulting in nearly zero net field. In the near-field region, the security tag 50 moves between the entrance pedestals 22 capturing more field from on half of the antennas than from the other half of the antennas causing deactivation. The resultant far-field cancellation due to the design of these loop antennas 400 allows the system to transmit more power while remaining within regulatory limits. The design of the loop antennas 400 create a field pattern that confines the energy of the deactivation field within the proximity of the deactivating generator 26 so as not to interfere with other devices at further distance.

Figure 9:
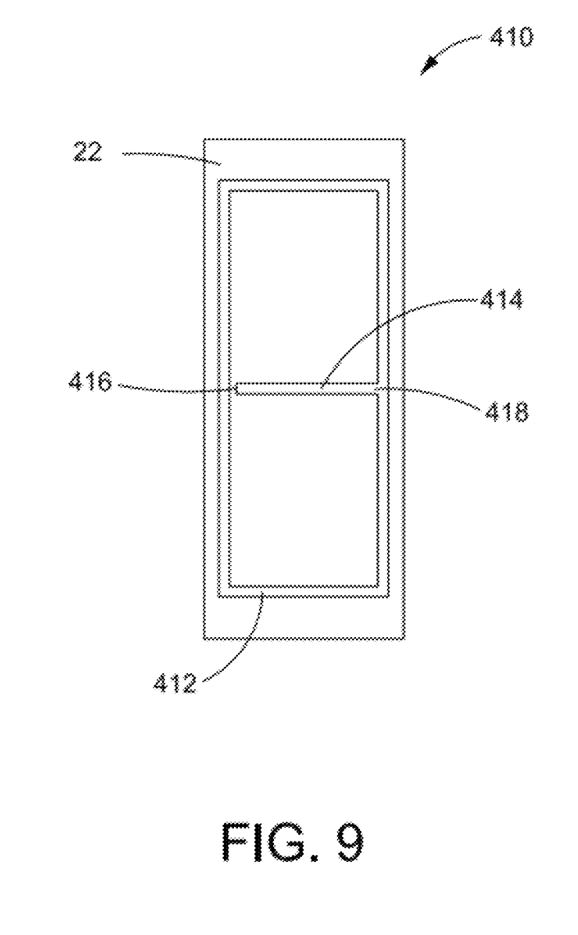
FIG. 9 depicts the vertical two-loop antenna of FIG. 8 according to one embodiment.

FIG. 9 depicts the vertical two-loop antenna 410 of FIG. 8. As shown in FIG. 9, vertical two-loop antenna 410 may be a continuous antenna piece, except for the disconnection at the vertical half connection end 416 to the vertical antenna perimeter 412.

As shown in FIG. 9, the vertical two-loop antenna 410 has a vertical antenna perimeter 412 formed in the shape of rectangle, in the alternative embodiment, the rectangle shape of the vertical antenna perimeter 412 approximately matches the height and width of the entrance pedestal 22 on which the vertical two-loop antenna 410 is located. As shown in FIG. 9, a vertical antenna middle strip 414 is located inside the rectangular shaped vertical antenna perimeter 412 and connected to the vertical antenna perimeter 412 at vertical perimeter connection 418. The only disconnect in the vertical two-loop antenna 410, as shown in FIG. 9, is between the vertical antenna middle connection end 416 and one side of the rectangular shaped vertical antenna perimeter 412, opposite the side of the vertical antenna perimeter 412 having vertical perimeter connection 418 with vertical antenna middle strip 414. As shown in FIG. 9, the vertical antenna middle strip 414 approximately splits the loop formed by the vertical antenna perimeter 412 into two rectangular looped antenna portions wherein the vertical antenna middle strip 414 forms the top of one loop and forms the bottom of the other loop.

Referring again to FIG. 8, the vertical two-loop antenna 410 is located externally, adhered, on the wall of the entrance pedestal 22 facing away from the other entrance pedestal 22. In other embodiments, the vertical two-loop antenna 410 may be located inside the walls of the entrance pedestal 22. In other embodiments, the vertical two-loop antenna 410 may be located externally on the opposing side of the entrance pedestal 22 facing the other entrance pedestal 22. As shown in this alternative embodiment, the vertical two-loop antenna 410 is approximately the width and height of the entrance pedestal 22 and is positioned centrally on the entrance pedestal 22. In other embodiments, the vertical two-loop antenna 410 may he any size smaller than the height and width of the entranced pedestal 22.

Figure 10:
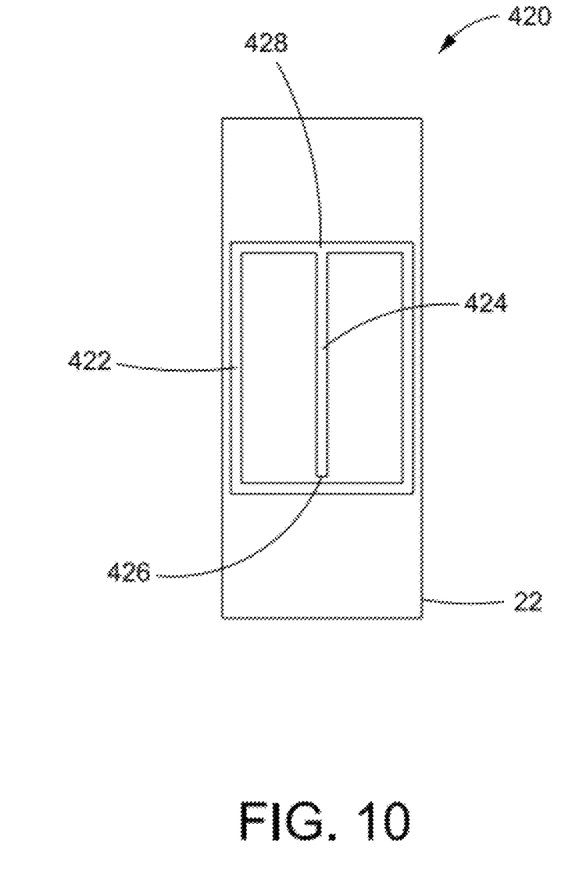
FIG. 10 depicts the horizontal two-loop antenna of FIG. 8 according to one embodiment.

FIG. 10 depicts the horizontal two-loop antenna 420 of FIG. 8. As shown in FIG. 10, horizontal two-loop antenna 420 may be a continuous antenna piece except for the disconnection at the horizontal antenna middle connection end 426 to the horizontal antenna perimeter 422.

As shown in FIG. 10, the horizontal two-loop antenna 420 has a horizontal antenna perimeter 422 formed in the shape of a rectangle. In the alternative embodiment, the rectangle shape of the horizontal antenna perimeter 422 is shorter in height and wider than the vertical two-loop antenna 410 located about the same entrance pedestal 22. As shown in FIG. 10, horizontal antenna middle strip 424 is located inside the rectangular shaped horizontal antenna perimeter 422 and connected to the horizontal antenna perimeter 422 at horizontal perimeter connections 428. The only disconnect in the horizontal two-loop antenna 420, as shown in FIG. 10, is between the horizontal antenna middle connection end 426 and one side of the rectangular shaped horizontal antenna perimeter 422, opposite the side of the horizontal antenna perimeter 422 having connection at the horizontal perimeter connection 428 with horizontal antenna middle strip 424 As shown in FIG. 10, the horizontal antenna middle strip 424 approximately splits the loop formed by the horizontal antenna perimeter 422 into two rectangular looped antenna portions wherein the horizontal antenna middle strip 424 forms a side of one loop and forms a side of the other loop.

Referring again to FIG. 8, the horizontal two-loop antenna 420 is located externally, as adhered onto the wall of entrance pedestal 22 on the site facing the other entrance pedestal 22. In other embodiments, the horizontal two-loop antenna 420 may be located inside the walls of the entrance pedestal 22. In other embodiments, the horizontal two-loop antenna 420 may he located externally on the wall on the side of the entrance pedestal 22 facing away from the other entrance pedestal 22. As shown in this alternative embodiment, the horizontal two-loop antenna 420 is located approximately central to the vertical two-loop antenna 410, such that the horizontal antenna middle strip 424 and vertical antenna middle strip 414 are positioned orthogonal to each other to form a cross approximately in the center of the entrance pedestal 22, as shown through the transparent entrance pedestal 22. In other embodiments, the horizontal two-loop antenna 420 may be any size smaller or larger than the height and width of the vertical two-loop antenna 410 shown in FIG. 8.

Far-field cancellation with strong near-field emissions are created due to the relative position of the vertical two-loop antenna 410 with the horizontal two-loop antenna 410, creating the formed cross design of the horizontal antenna middle strip 424 and vertical antenna middle strip 414. In combination, the relative position of the vertical two-loop antenna 410 with the horizontal two-loop antenna 410 may deactivate a security tag 50 in any orientation.

The loop antennas 400 are preferably made of copper tape. Alternatively, like the S-shape antenna 200, other conductive materials may be utilized to form the antennas, those materials being known by one of ordinary skill in the art. In the preferred embodiment, the copper tape is two inches thick. Thicker or thinner tape or material may be used.

As shown in FIG. 8, both the vertical two-loop antenna 410 and horizontal two-loop antenna 420 are each attached to a current generator 27. In this alternative embodiment, the current generator 27 is a high power generator. One of two generator leads 29 from one current generator 27 in the entrance pedestal 22 connects to the vertical antenna middle connection end 416 and the other generator lead 29 connects to the vertical antenna perimeter 412 directly across from the disconnection formed between the vertical antenna middle connection end 416 and one side of vertical antenna perimeter 412, on the opposite side of the perimeter 412 in connection with the vertical antenna middle strip 414 about vertical perimeter connection 418. One of two generator leads 29 from the other current generator 27, in the same entrance pedestal 22, connects to the horizontal antenna middle connection end 426 and the other generator lead 29 connects to the horizontal antenna perimeter 422 directly across from the disconnection formed between the horizontal antenna middle connection end. 426 and one side of horizontal antenna perimeter 422, on the opposite side of the perimeter 422 in connection with the horizontal antenna middle strip 424 about horizontal perimeter connect on 428. The current generators 27 supply current through the loop antennas 400 resulting in a transmitted EM field 28 (see FIG. 1) formed about the entrance pedestals 22, resulting in a deactivation field pattern to deactivate security tags 50 at any orientation, including at orientation of side carry tag 52, flat carry tag 54, and/or front carry tag 56 (see FIG. 3), at or near the entrance of a store.

Antennas, such as the S-shape antennas 200 or loop antennas 400, may be placed on material housed within the walls of the pedestals. For example, antennas may be attached to or placed within a sheet of material, formed to fit within the pedestal. The sheet of material may be plastic, cardboard, Styrofoam, or any other material of which the antenna may be attached to or placed within. The antennas may be a continuous antenna piece or a combination of segments to form the antenna.

In both the preferred or alternative embodiments, the deactivating generators 26 may deactivate more than one security tag 50 passing through the entrance pedestals 22. The deactivating generators 26 may deactivate the one or more security tags 50 regardless of their orientation. One or more deactivating generators 26 may be integrated with an entrance pedestal 22. In other embodiments, one or more deactivating generators 26 may be located in one entrance pedestal 22 and not the other. One or more current generators 27 may be integrated within an entrance pedestal 22. In other embodiments, one or more current generators 27 may be located in one entrance pedestal 22 and not the other. In other embodiments, a current generator 27 may be located away from the entrance pedestals 22, wherein the generator leads 29 may extend from the current generator 27 to the antenna in or on the entrance pedestal 22. In some embodiments, the current generator 27 may drive current to an antenna in another entrance pedestal 22. In other embodiments, an antenna may be located in one entrance pedestal 22 and not the other entrance pedestal 22. In other embodiments, one, two, or more generator leads 29 may be connected between an antenna and current generator 27 in any manner in Which to drive current from the current generator 27 to and/or through the antenna. In other embodiments, the current generator 27 and antenna form the deactivating generator 26 or a portion of the deactivating generator 26.

The S-shape, antennas 200, loop antennas 400, or any other shaped antennas may also be used in deactivating generators 126 for pedestals 122 of bi-directional doorways, as shown in the system/method 120 of FIG. 2, as an alternative or in addition to antennas used in deactivating generators 2$ for entrance pedestals 22 of "one way" configurations, as shown with system/method 120 of FIG. 1.

Entrance pedestals 22 and pedestals 122, of bi-directional doorways, serve as housings for the deactivating generators to be enclosed within or attached about. For example, in the preferred embodiment, the S-shape antennas 200 are enclosed within the entrance pedestal 22, and the current generators 27 are adhered to the outside surface of the entrance pedestal 22. In other embodiments, the current generators 27 maybe located within the entrance pedestal 22. In other embodiments, the housing to include the antenna and/or current generator 27, may be of various sizes and shapes. The housing, being the entrance pedestal 22 in the preferred embodiment, may be oriented such that the electromagnetic field 28 covers at least a portion of the store, or business establishment entrance. In other embodiments, the housing may be a mount to be located about the entrance. As a mount, the housing may not stand on its own like a pedestal. The mount may be located on a shelf, hang from a ceiling, or affixed to a wall or doorway.

It is to be understood that the descriptions of this disclosure have been simplified to illustrate characteristics that are relevant for a clear understanding of the disclosure. Those of ordinary skill in the art may recognize that other elements or steps are desirable or required in implementing this disclosure. However, because such elements or steps are well known in the art, and because they do not facilitate a better understanding of the disclosure, a discussion of such elements or steps is not provided herein. The disclosure herein is directed to all such variations and modifications to such elements and methods known to those skilled in the art.

It is to he understood that the disclosure may assume various alternative orientations and step sequences, except where expressly specified to the contrary. It is also to be understood that the specific devices and processes illustrated in the attached drawings, and described in this specification are simply exemplary embodiments of the concepts defined in the appended claims. Hence, specific dimensions and other physical characteristics relating to the embodiments disclosed herein are not to be considered as limiting, unless the claims expressly state otherwise.

Further, since numerous modifications and changes will readily occur to those skilled in the art, it is not desired to limit the invention to the exact construction and operation Shown and described, and accordingly all suitable modifications and equivalents may be regarded as falling within the scope of this disclosure as defined by the claims that follow.

What is claimed is:

1. A deactivation system comprising:
  a plurality of pedestals positioned at an entrance of a business establishment, wherein one pedestal is positioned at one side of the entrance and another pedestal is positioned at another side of the entrance;
  a security tag deactivator attached to at least one of the plurality of pedestals positioned at the entrance, wherein the security tag deactivator is configured to generate an electromagnetic field in the entrance for deactivating a security tag positioned at or near the entrance; and
  a direction sensing device configured to determine whether the security tag is entering or leaving the business establishment via the entrance,
  wherein the security tag deactivator deactivates the security tag based on whether the security tag is entering the business establishment via the entrance.

2. The deactivation system of claim 1, further comprising at least one antenna and at least one current generator coupled to the at least one antenna, wherein the current generator is coupled to the antenna by a pair of generator leads and wherein the current generator drives current to flow from one generator lead through the antenna to the other generator lead to generate the electromagnetic field about the antenna.

3. The deactivation system of claim 2, wherein the at least one antenna comprises:
  an antenna perimeter; and
  a middle antenna portion, wherein the middle antenna portion is designed in the shape of the letter S and connects to the antenna perimeter at opposing sides of the antenna perimeter.

4. The deactivation system of claim 1, wherein the security tag deactivator comprises:
  two or more antennas; and
  at least two current generators each coupled to the two or more antennas, wherein the current generator is coupled to the antenna by a pair of generator leads and wherein the current generator drives current to flow from one generator lead through the antenna to the other generator lead to generate the electromagnetic field about the antenna;
  wherein at least two antennas are configured as loop antennas, comprising a first antenna configured as a vertical two-loop antenna and a second antenna configured as a horizontal two-loop antenna.

5. The deactivation system of claim 4, wherein the vertical two-loop antenna comprises:
  a vertical antenna perimeter; and
  a vertical antenna middle strip, wherein one end of the vertical antenna middle strip connects to one side of the vertical antenna perimeter and wherein the other end of the vertical antenna middle strip is coupled to a first current generator by a first generator lead of the first current generator and wherein a side of the vertical perimeter, opposite the side of the vertical perimeter connected to the vertical antenna middle strip, is coupled to the first current generator by a second generator lead of the first current generator and wherein the vertical antenna middle strip divides the vertical antenna perimeter into two nearly equal halves wherein one half is vertically aligned in relation to the other half; and
  wherein the horizontal two-loop antenna comprises:
    a horizontal antenna perimeter; and
    a horizontal antenna middle strip, wherein one end of the horizontal antenna middle strip connects to one side of the horizontal antenna perimeter and wherein the other end of the horizontal antenna middle strip is coupled to a second current generator by a first generator lead of the second current generator and wherein a side of the horizontal perimeter, opposite the side of the horizontal perimeter connected to the horizontal antenna middle strip, is coupled to the second current generator by a second generator lead of the second current generator and wherein the horizontal antenna middle strip divides the horizontal antenna perimeter into two nearly equal halves wherein one half is horizontally aligned in relation to the other half; and wherein the vertical antenna middle strip and horizontal middle strip are positioned orthogonal to one another so as to form a cross.

6. The deactivating system of claim 1, wherein the security tag deactivator deactivates the security tag when the security tag is entering the business establishment and the security tag deactivator does not deactivate the security tag when the security tag is exiting the business establishment.

7. The deactivation system of claim 1, wherein the security tag deactivator is enclosed within the at least one of the plurality of pedestals.

8. A deactivator comprising:
an antenna configured to transmit an electromagnetic field sufficient to deactivate a security tag when a current flows through the antenna, wherein a design of the antenna creates a deactivation field pattern that confines the energy of the electromagnetic field within a proximity of the deactivator;
a current generator coupled to the antenna by one or more generator leads, wherein the current generator is configured to drive the current through the antenna to an entrance of a business establishment;
a second antenna;
a second current generator coupled to the second antenna;
wherein the two antennas are configured as loop antennas, comprising the antenna configured as a vertical two-loop antenna and the second antenna configured as a horizontal two-loop antenna;
wherein the vertical two-loop antenna comprises:
a vertical antenna perimeter; and
a vertical antenna middle strip, wherein one end of the vertical antenna middle strip connects to one side of the vertical antenna perimeter and another end of the vertical antenna middle strip is coupled to the current generator by a first generator lead of the current generator and wherein a side of the vertical perimeter, opposite the side of the vertical perimeter connected to the vertical antenna middle strip, is coupled to the current generator by a second generator lead of the current generator and wherein the vertical antenna middle strip divides the vertical antenna perimeter into two nearly equal halves wherein one half is vertically aligned in relation to the other half; and
wherein the horizontal two-loop antenna comprises:
a horizontal antenna perimeter; and
a horizontal antenna middle strip, wherein one end of the horizontal antenna middle strip connects to one side of the horizontal antenna perimeter and another end of the horizontal antenna middle strip is coupled to a second current generator by a first generator lead of the second current generator and wherein a side of the horizontal perimeter, opposite the side of the horizontal perimeter connected to the horizontal antenna middle strip, is coupled to the second current generator by a second generator lead of the second current generator and wherein the horizontal antenna middle strip divides the horizontal antenna perimeter into two nearly equal halves wherein one half is horizontally aligned in relation to the other half; and wherein the vertical antenna middle strip and horizontal middle strip are positioned orthogonal to one another so as to form a cross; and
a housing configured to include at least one of the antenna and current generator.

9. The deactivator of claim 8, wherein the design of the antenna includes the antenna being configured in an S-shape.

10. The deactivator of claim 8, wherein the housing is further configured to stand or mount such that the electromagnetic field covers at least a portion of the entrance of the business establishment.

11. The deactivator of claim 8, wherein the antenna comprises:
an antenna perimeter; and
a middle antenna portion, wherein the middle antenna portion is designed in the shape of the letter S and connects to the antenna perimeter at opposing sides of the antenna perimeter.

12. A method, comprising:
positioning a plurality of pedestals at an entrance of a business establishment, wherein one pedestal is positioned at one side of the entrance and another pedestal is positioned at another side of the entrance;
attaching a security tag deactivator to at least one of the plurality of pedestals positioned at the entrance;
generating an electromagnetic field, via the security tag deactivator, in the entrance, wherein the electromagnetic field can deactivate a security tag positioned at or near the entrance;
determining whether the security tag is entering or leaving the business establishment via the entrance; and
deactivating the security tag based on whether the security tag is entering the business establishment via the entrance.

13. The method of claim 12, wherein the step of deactivating the security tag comprises driving a flow of current from a current generator to an antenna, wherein the antenna is coupled to the current generator by a pair of generator leads, wherein the antenna and current generator form a portion of the security tag deactivator.

14. The method of claim 13, wherein the antenna comprises:
an antenna perimeter; and
a middle antenna portion, wherein the middle antenna portion is designed in the shape of the letter S and connects to the antenna perimeter at opposing sides of the antenna perimeter.

15. The method of claim 13, wherein the deactivator further comprises:
a second antenna; and
a second current generator coupled to the second antenna;
wherein the two antennas are configured as loop antennas comprising the first antenna configured as a vertical two-loop antenna and the second antenna configured as a horizontal two-loop antenna.

16. The method of claim 15, wherein the vertical two-loop antenna comprises:
a vertical antenna perimeter; and
a vertical antenna middle strip, wherein one end of the vertical antenna middle strip connects to one side of the vertical antenna perimeter and wherein the other end of the vertical antenna middle strip is coupled to a first current generator by a first generator lead of the first current generator and wherein a side of the vertical perimeter, opposite the side of the vertical perimeter connected to the vertical antenna middle strip, is coupled to the first current generator by a second generator lead of the first current generator and wherein the vertical antenna middle strip divides the vertical antenna perimeter into two nearly equal halves wherein one half is vertically aligned in relation to the other half; and wherein the horizontal two-loop antenna comprises:
  a horizontal antenna perimeter; and
  a horizontal antenna middle strip, wherein one end of the horizontal antenna middle strip connects to one side of the horizontal antenna perimeter and wherein the other end of the horizontal antenna middle strip is coupled to a second current generator by a first generator lead of the second current generator and wherein a side of the horizontal perimeter, opposite the side of the horizontal perimeter connected to the horizontal antenna middle strip, is coupled to the second current generator by a second generator lead of the second current generator and wherein the horizontal antenna middle strip divides the horizontal antenna perimeter into two nearly equal halves wherein one half is horizontally aligned in relation to the other half; and wherein the vertical antenna middle strip and horizontal middle strip are positioned orthogonal to one another so as to form a cross.

17. The method of claim 12, wherein the step of coupling the security tag deactivator to the at least one of the plurality of pedestals positioned at the entrance comprises attaching an antenna onto the one pedestal, wherein the one pedestal stands upright on a floor in the entrance of the business establishment.

18. The method of claim 12, wherein the step of deactivating the security tag based on whether the security tag is entering or exiting the business establishment further comprises deactivating the security tag when the security tag is entering the business establishment and not deactivating the security tag when the security tag is exiting the business establishment.

* * * * *